(12) United States Patent
  Wroble

(10) Patent No.: US 9,038,509 B1
(45) Date of Patent: May 26, 2015

(54) HYDRAULIC DRILL STEEL HANDLING APPARATUS

(71) Applicant: Charles F. Wroble, Corvallis, MT (US)

(72) Inventor: Charles F. Wroble, Corvallis, MT (US)

( * ) Notice: Subject to any disclaimer, the term of this patent is extended or adjusted under 35 U.S.C. 154(b) by 131 days.

(21) Appl. No.: 13/963,295

(22) Filed: Aug. 9, 2013

Related U.S. Application Data

(60) Provisional application No. 61/681,542, filed on Aug. 9, 2012.

(51) Int. Cl.
  *B23G 1/52* (2006.01)
  *B23Q 7/00* (2006.01)
  *B23G 11/00* (2006.01)
  *B23G 1/22* (2006.01)

(52) U.S. Cl.
  CPC ... *B23Q 7/00* (2013.01); *B23G 1/22* (2013.01); *B23G 11/00* (2013.01); *B23G 2240/24* (2013.01)

(58) Field of Classification Search
  CPC ........... E21B 19/15; E21B 19/00; B23G 1/22; B23G 1/224; B23G 11/00; B23G 11/224; B23G 11/24; B23G 1/225
  See application file for complete search history.

(56) References Cited

U.S. PATENT DOCUMENTS

| | | | |
|---|---|---|---|
| 2,210,531 A | 8/1940 | Engelbaugh et al. | |
| 2,543,945 A | 3/1951 | Taylor | |
| 3,128,817 A | 4/1964 | Shaver | |
| 3,480,159 A * | 11/1969 | White et al. | 414/15 |
| 3,493,125 A * | 2/1970 | White et al. | 414/15 |
| 3,916,500 A | 11/1975 | Brown | |
| 3,941,256 A * | 3/1976 | Doe et al. | 414/17 |
| 4,002,248 A | 1/1977 | Moller | |
| 4,088,230 A * | 5/1978 | Doe et al. | 414/15 |
| 4,402,120 A * | 9/1983 | Haygood | 29/40 |
| 4,417,363 A * | 11/1983 | Lee, Jr. | 82/124 |
| 4,453,872 A | 6/1984 | Frias et al. | |
| 4,465,422 A | 8/1984 | Blust, Sr. et al. | |
| 4,516,306 A | 5/1985 | Albert | |
| 5,115,702 A * | 5/1992 | Link | 82/126 |
| 6,044,735 A * | 4/2000 | Crippa | 82/124 |
| 7,223,054 B1 * | 5/2007 | Cady | 409/143 |
| 7,765,904 B2 | 8/2010 | Tejeda | |
| 7,815,032 B2 | 10/2010 | Preston et al. | |
| 8,087,857 B2 | 1/2012 | Schawe | |
| 8,215,888 B2 | 7/2012 | Tetley et al. | |
| 2009/0304471 A1 * | 12/2009 | Tejeda | 409/131 |

FOREIGN PATENT DOCUMENTS

WO  2012/189911 A1  2/2012

* cited by examiner

*Primary Examiner* — Will Fridie, Jr.
(74) *Attorney, Agent, or Firm* — Jean Kyle

(57) ABSTRACT

A single apparatus handles drill steel to position the drill steel pieces for tooling and repair by a lathe. Drill steel needing repair is accepted on rails of the apparatus. A drill steel piece to be repaired is moved along the rails and is moved onto hydraulic drive cylinders. The drive cylinders raise and move a first end of the drill steel piece into the lathe. Support cylinders raise to support the piece while it is being re-threaded and repaired by the lathe. The drive cylinders reverse to remove the drill steel piece from the lathe. A pivot raises to capture the drill steel piece and rotates the piece to present a second end of the piece to the lathe. The drive cylinders and support cylinders likewise present, support, and remove the second end to the lathe for re-threading and repair. A unitary frame supports the rails, the drive cylinders, the support cylinders, the lifting/rotating pivot cylinder, and the hydraulics of the apparatus.

20 Claims, 3 Drawing Sheets

HYDRAULIC DRILL STEEL HANDLING APPARATUS

CROSS-REFERENCE TO RELATED APPLICATIONS

This application claims the benefits of U.S. Provisional Patent Application No. 61/681,542, filed Aug. 9, 2012, the disclosure of which is hereby incorporated by reference in its entirety including all figures, tables and drawings.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

In any business, time is money. However, in some businesses, the sheer size of the material and equipment, and concerns for safety, require jobs to move slowly. An example of such a business is drilling in an oil field. Wells are drilled miles into the ground. Drill steel used to drill these wells is from 2⅞ to 8 inches in diameter and about 40 feet long. One end of a piece of drill steel has exterior threads which are accepted by the internal threads on the other end of a like piece. These delicate threads are often damaged during the drilling process and are repaired by re-threading them with a lathe. Currently, it takes a crane and 3-4 men to position each piece of drill steel into a lathe for repair. The process of positioning the first end of the piece into the lathe, removing it, turning it, and positioning the second end of the piece into the lathe takes about 40 minutes. Reducing the time and manpower needed to complete this process would lessen its cost.

A need remains for a process or apparatus to handle drill steel that is automated, requires fewer workers, and takes less time.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention is a unitary apparatus for handling drill steel that is being processed by a lathe. A frame supports rails to hold the drill steel, drive cylinders, support cylinders, a lifting/rotating pivot cylinder, hydraulics for the apparatus, and a control panel. The subject apparatus is a single unit with which drill steel is handled reducing the man-hours and time currently required to repair the drill steel pieces.

DETAILED DESCRIPTION OF THE INVENTION

The apparatus of the subject invention is a single unit that handles drill steel to position it in a lathe for repair. Currently, drill steel pieces are positioned by various air cylinder supports and are set with a chain hoist. The subject apparatus provides drive cylinders, support cylinders, a lifting/rotating pivot cylinder, hydraulics, and a control panel all within a single frame.

Figure 1:
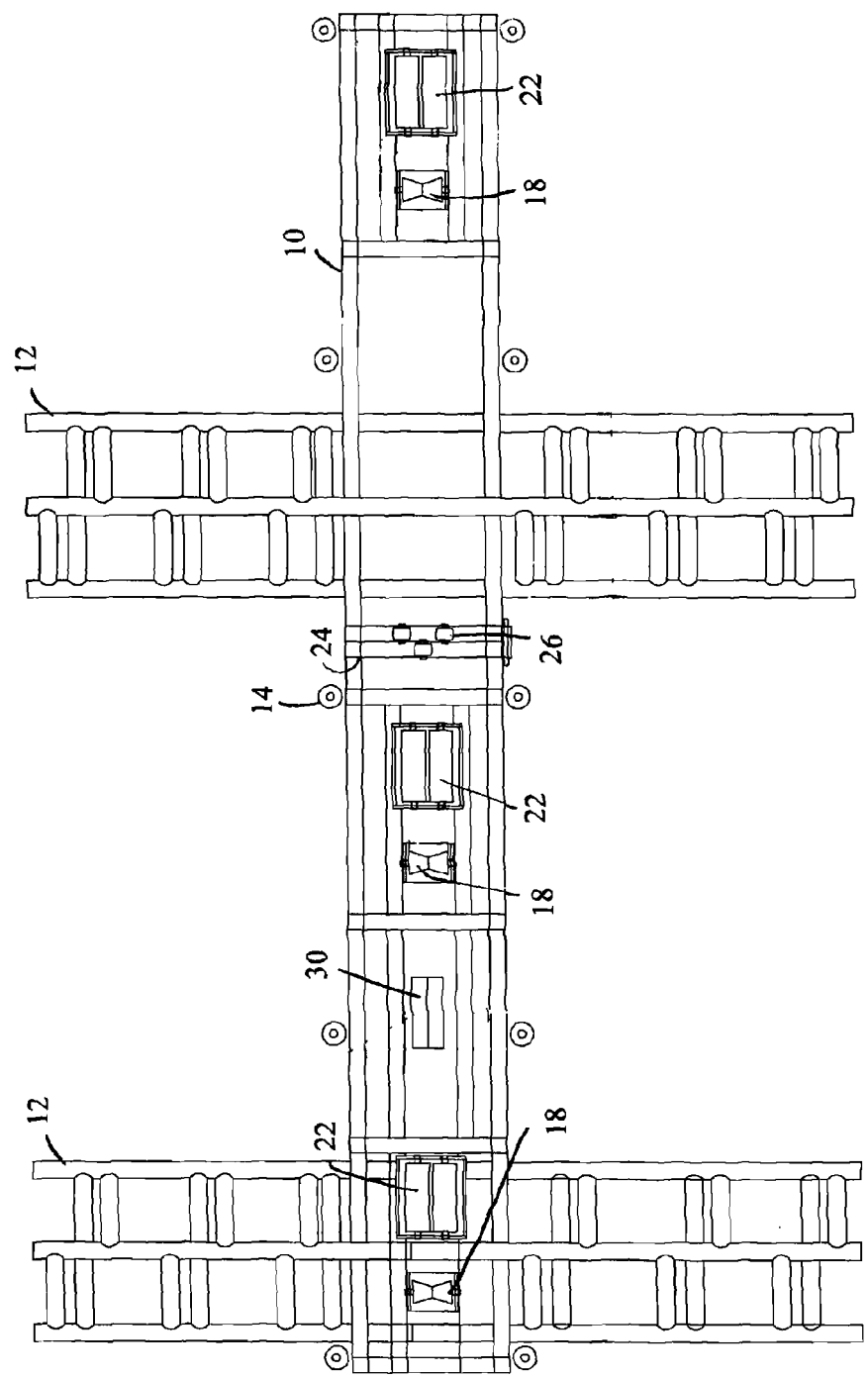
FIG. 1 is a top plan view of a preferred embodiment of the handling apparatus of the subject invention.
Figure 2:
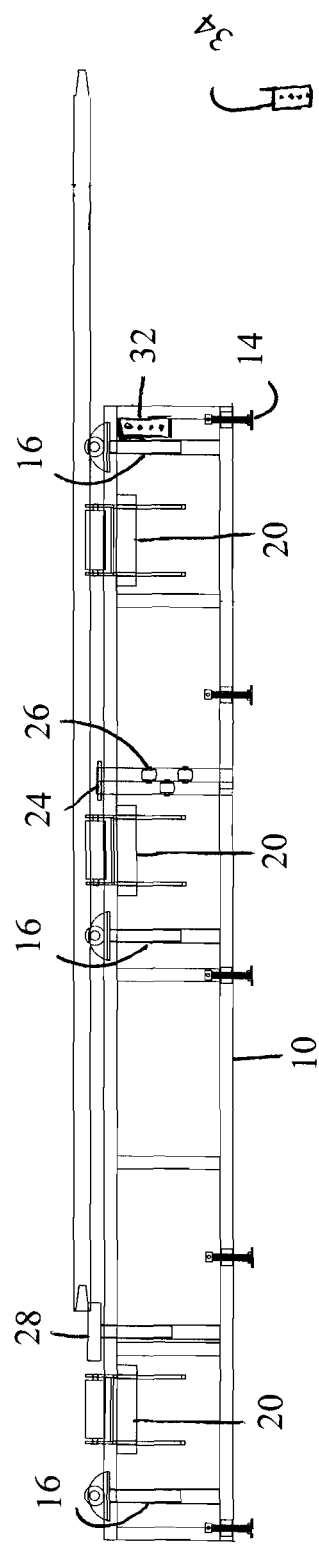
FIG. 2 is a side elevational view of the preferred embodiment of the handling apparatus of the subject invention shown in FIG. 1 without the feeder racks.
Figure 3:
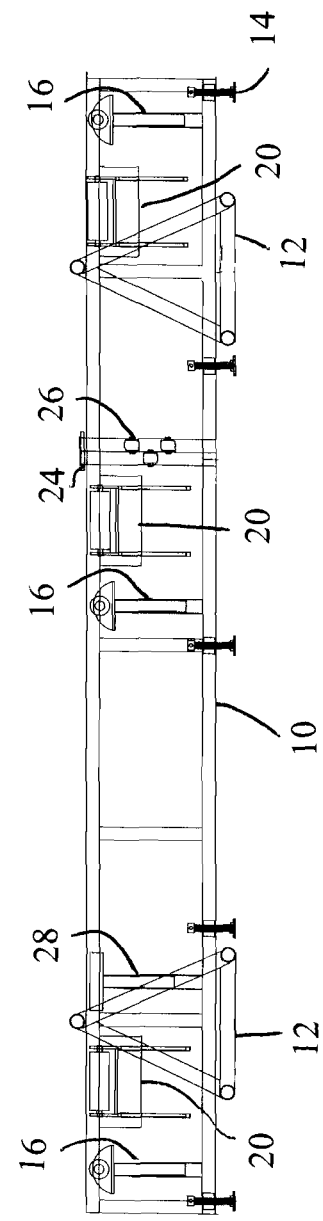
FIG. 3 is a side elevational view of the preferred embodiment of the handling apparatus of the subject invention shown in FIG. 1.

An exemplified embodiment of the handling apparatus of the subject invention is shown in FIGS. 1-3. The cylinders that lift and handle the drill steel pieces are housed in a single frame 10. The frame abuts the lathe (not shown). In this embodiment, the frame also supports rails 12 on which multiple drill steel pieces rest before being set for the lathe (FIG. 1). The frame should be a length that adequately supports the pieces of drill steel being handled. Preferably, the frame is set on adjustable legs 14. The height of the port of lathes vary by manufacturer. Height adjustable legs allow the subject apparatus to work with most lathes. In the exemplified embodiment, the frame is constructed of welded square steel tubes. The welded steel provides the strength needed to support the drill steel. It is noted however that the frame can be constructed of any material that has the adequate strength and durability to handle drill steel pieces.

The frame supports drive cylinders 16. A piece of drill steel rolled onto these drive cylinders 16 is raised to meet the port on the lathe and then a first end of the drill steel piece is pushed into the lathe. In the exemplified embodiment, the frame supports three hydraulic drive cylinders and V-type 18 rollers sit atop the drive cylinders to support and move the drill steel piece. The use of hydraulic cylinders is preferred. Air cylinders can be unpredictable and difficult to use under certain environmental conditions. Although the apparatus of the subject invention is shown with three drive cylinders, it is important to note that more or less than three can be placed along the frame. It is only required that there be enough cylinders to drive the piece into the lathe while it is adequately supported. Further, although the V-type rollers offer a firm seat and some guidance as the rail moves toward the lathe, any roller is suitable for the driver cylinders that allows the piece to move toward the lathe.

Once the piece is set into the lathe, support cylinders 20 raise up to hold the piece as it is re-threaded. In the exemplified embodiment, the support cylinders 20 have a pair of adjacent rollers 22 positioned along the longitudinal axis of the piece. The drill steel piece rests above the space between the rollers. The rollers allow the piece to rotate within the lathe. In a particularly preferred embodiment, the frame 10 has a safety unit 24 of free rotating shafts in a chain assembly 26 to drape over the drill steel piece while it is being worked by the lathe. The safety unit 24 holds the piece if it jumps from the rollers. The exemplified embodiment also has three support cylinders. Like the choice and positioning of the drive cylinders however, the choice of rollers and number and positioning of the support cylinders depends only upon providing adequate support for the pieces as they are being processed in the lathe.

Upon completion of repair to the first end of the drill steel piece, the drive cylinders 16 raise to again support it. The support cylinders 20 move away. The drive cylinders move the first end of the piece out of the lathe and a lifting/rotating pivot cylinder 28 raises to meet and support the piece. The drive cylinders move away. In the exemplified embodiment, the piece is held on the pivot cylinder within a trough 30. One skilled in the art would realize however that a number of means would be suitable to support the piece, including, but not limited to, a plurality of saddles. The lifting/rotating pivot cylinder 28 rotates the piece to present the second end of the piece to the lathe. The second end of the piece is then inserted and removed from the lathe the same as the first end using the drive cylinders and support cylinders.

The frame 10 holds the hydraulics necessary to move the cylinders and also supports a control panel 32. The control panel allows a single operator to control the handler apparatus. The apparatus can also be controlled by a remote 34 potentially allowing a single operator to control not only the handler but to run the lathe as well. The apparatus of the subject invention greatly reduces the manpower and man-hours required for processing drill steel pieces. The unitary design of the apparatus allows a single operator to handle pieces once they are placed on the machine. A forklift can place 6-8 pieces on the outer edge of the rail of the handler. One man can move a single piece to be handled by the drive cylinders. The crane currently used to rotate the piece when the first end is complete is not required because the subject apparatus has the lifting/rotating pivot cylinder. Finished pieces are moved to the off side of the rack. The batch of 6-8 pieces then are removed by the forklift. The subject pieces are processed in multiples instead of being positioned one by one by a crane. The subject invention saves money in manpower and equipment and about 30 minutes in handling time.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. An apparatus for handling drill steel being re-threaded by a lathe comprising:
    a frame capable of supporting a drill steel piece, the frame comprising;
        at least one drive cylinder;
        at least one support cylinder; and
        a pivot cylinder;
    whereby,
        the at least one drive cylinder contacts the drill steel piece and positions an end of the drill steel piece in the lathe,
        the at least one support cylinder contacts the drill steel piece and the at least one drive cylinder breaks contact with the drill steel piece, the at least one support cylinder supports the drill steel piece as it is being re-threaded,
        when re-threading is complete, the at least one drive cylinder contacts the drill steel piece and the at least one support cylinder breaks contact, the at least one drive cylinder moves the drill steel piece out of the lathe,
        the pivot cylinder contacts the drill steel piece and the at least one drive cylinder breaks contact with the drill steel piece, the pivot cylinder pivots the drill steel piece to present another end of the piece to the lathe,
        the at least one drive cylinder contacts the drill steel piece and the pivot cylinder breaks contact, the at least one drive cylinder positions the another end of the drill steel piece in the lathe,
        the at least one support cylinder contacts the drill steel piece and the at least one drive cylinder breaks contact with the drill steel piece, the at least one support cylinder supports the drill steel piece as it is being re-threaded,
        when re-threading is complete, the at least one drive cylinder contacts the drill steel piece and the at least one support cylinder breaks contact, the at least one drive cylinder moves the drill steel piece out of the lathe.

2. The apparatus of claim 1, wherein said frame has adjustable legs.

3. The apparatus of claim 1, wherein said frame has rails to support at least one drill steel piece that is not being re-threaded.

4. The apparatus of claim 1, wherein at least one of said at least one drive cylinder, said at least one support cylinder, and said pivot cylinder is a hydraulic cylinder.

5. The apparatus of claim 1, wherein each of said at least one drive cylinder, said at least one support cylinder, and said pivot cylinder are hydraulic cylinders.

6. The apparatus of claim 1, wherein said at least one drive cylinder has a V-shaped roller to hold the drill steel piece.

7. The apparatus of claim 1, wherein said at least one support cylinder has parallel roller positioned along a longitudinal axis of the drill steel piece.

8. The apparatus of claim 1, wherein said apparatus has three drive cylinders.

9. The apparatus of claim 1, wherein said apparatus has three support cylinders.

10. The apparatus of claim 1, wherein said frame is constructed of square steel tubing.

11. The apparatus of claim 1, further comprising an control panel by which an operator can control said at least one drive cylinder, said at least one support cylinder, and said pivot cylinder to contact and break contact with the drill steel piece.

12. The apparatus of claim 11, wherein said apparatus further comprises a remote to operate said control panel.

13. An apparatus for handling drill steel being re-threaded by a lathe comprising:
    a frame capable of supporting a drill steel piece, the frame comprising;
        at least one drive cylinder;
        at least one support cylinder;
        a pivot cylinder; and
        a control panel;
    whereby,
        the at least one drive cylinder contacts the drill steel piece and positions an end of the drill steel piece in the lathe,
        the at least one support cylinder contacts the drill steel piece and the at least one drive cylinder breaks contact with the drill steel piece, the at least one support cylinder supports the drill steel piece as it is being re-threaded,
        when re-threading is complete, the at least one drive cylinder contacts the drill steel piece and the at least one support cylinder breaks contact, the at least one drive cylinder moves the drill steel piece out of the lathe,
        the pivot cylinder contacts the drill steel piece and the at least one drive cylinder breaks contact with the drill steel piece, the pivot cylinder pivots the drill steel piece to present another end of the piece to the lathe,
        the at least one drive cylinder contacts the drill steel piece and the pivot cylinder breaks contact, the at least one drive cylinder positions the another end of the drill steel piece in the lathe,
        the at least one support cylinder contacts the drill steel piece and the at least one drive cylinder breaks contact with the drill steel piece, the at least one support cylinder supports the drill steel piece as it is being re-threaded,
        when re-threading is complete, the at least one drive cylinder contacts the drill steel piece and the at least one support cylinder breaks contact, the at least one drive cylinder moves the drill steel piece out of the lathe, and
        contact and breaking contact with the drill steel piece by the at least one drive cylinder, said at least one support cylinder, and said pivot cylinder is controlled by an operator using the control panel.

14. The apparatus of claim 13, wherein said apparatus further comprises a remote to operate said control panel.

15. The apparatus of claim 13, wherein at least one of said at least one drive cylinder, said at least one support cylinder, and said pivot cylinder is a hydraulic cylinder.

16. The apparatus of claim 13, wherein each of said at least one drive cylinder, said at least one support cylinder, and said pivot cylinder are hydraulic cylinders.

17. The apparatus of claim 13, wherein said at least one drive cylinder has a V-shaped roller to hold the drill steel piece.

18. The apparatus of claim 13, wherein said at least one support cylinder has parallel roller positioned along a longitudinal axis of the drill steel piece.

19. The apparatus of claim 13, wherein said apparatus has three drive cylinders and three support cylinders.

20. An apparatus for handling drill steel being re-threaded by a lathe comprising:
   a frame capable of supporting a drill steel piece, the frame comprising;
      three drive cylinders with V-shaped rollers;
      three support cylinders with two rollers parallel a longitudinal axis of the drill steel piece;
      a pivot cylinder; and
      a control panel;
whereby,
   the at least one drive cylinder contacts the drill steel piece and positions an end of the drill steel piece in the lathe,
   the at least one support cylinder contacts the drill steel piece and the at least one drive cylinder breaks contact with the drill steel piece, the at least one support cylinder supports the drill steel piece as it is being re-threaded,
   when re-threading is complete, the at least one drive cylinder contacts the drill steel piece and the at least one support cylinder breaks contact, the at least one drive cylinder moves the drill steel piece out of the lathe,
   the pivot cylinder contacts the drill steel piece and the at least one drive cylinder breaks contact with the drill steel piece, the pivot cylinder pivots the drill steel piece to present another end of the piece to the lathe,
   the at least one drive cylinder contacts the drill steel piece and the pivot cylinder breaks contact, the at least one drive cylinder positions the another end of the drill steel piece in the lathe,
   the at least one support cylinder contacts the drill steel piece and the at least one drive cylinder breaks contact with the drill steel piece, the at least one support cylinder supports the drill steel piece as it is being re-threaded,
   when re-threading is complete, the at least one drive cylinder contacts the drill steel piece and the at least one support cylinder breaks contact, the at least one drive cylinder moves the drill steel piece out of the lathe, and
   contact and breaking contact with the drill steel piece by the at least one drive cylinder, said at least one support cylinder, and said pivot cylinder is controlled by an operator using the control panel.

* * * * *